May 2, 1939.  A. F. BERGER  2,156,719
LUBRICANT SEAL
Filed Nov. 15, 1935
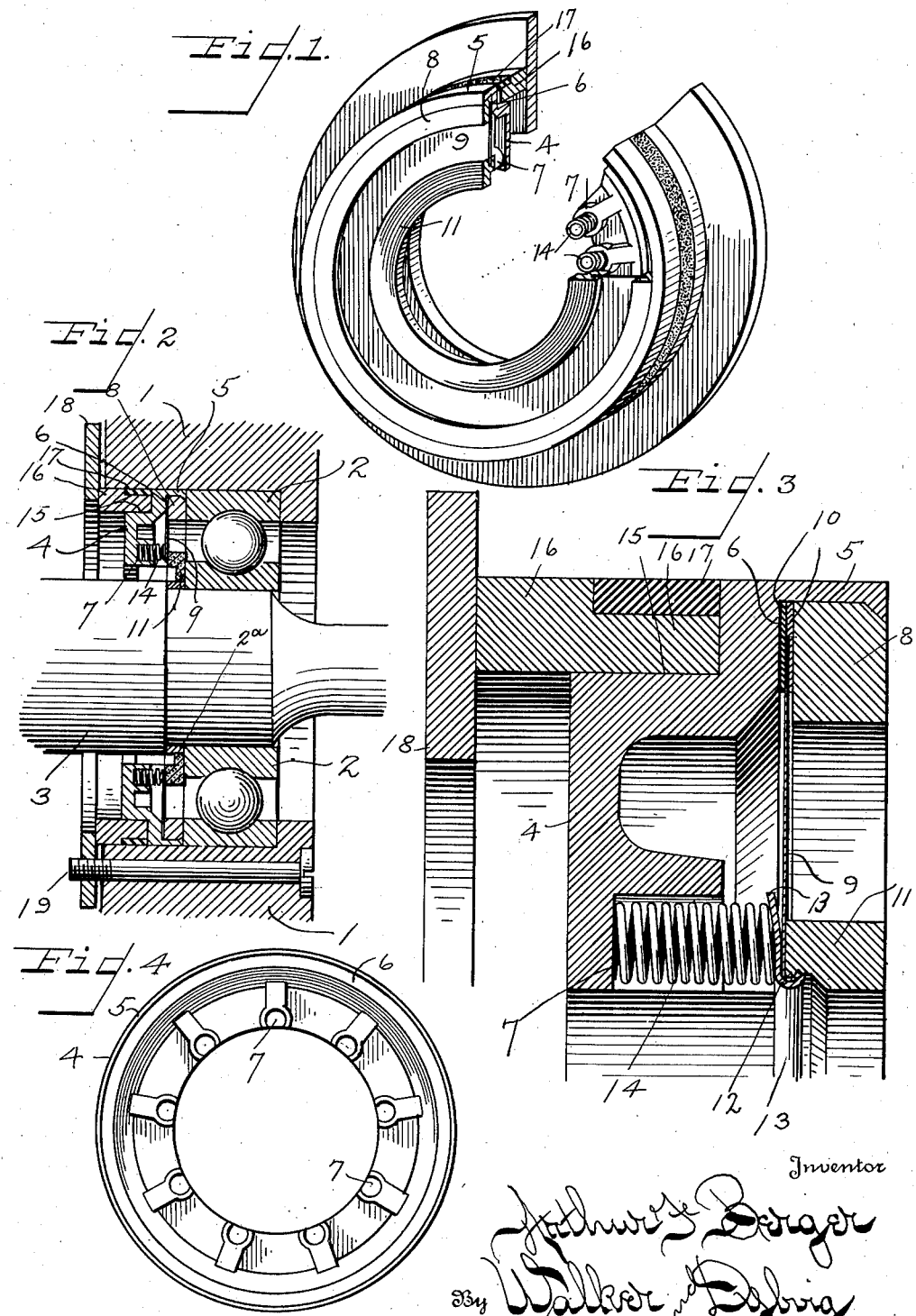
Inventor
Arthur F. Berger
By Walker and Dahvig
Attorney Patented May 2, 1939

2,156,719

UNITED STATES PATENT OFFICE 2,156,719

LUBRICANT SEAL

Arthur F. Berger, Dayton, Ohio, assignor to The Master Electric Company, Dayton, Ohio, a corporation of Ohio Application November 15, 1935, Serial No. 49,997

9 Claims. (Cl. 286—11)

This invention relates to lubricant seals for shaft bearings and more particularly to a unitary assembly of sealing and mounting elements.

The present invention pertains to that type of seat wherein a sealing collar connected with a flexible diaphragm has bearing contact with a rotating part or vice versa under yielding spring tension to maintain a fluid tight joint without retarding the relative rotation of the parts.

The object of the invention is to improve the construction as well as the means and mode of operation of bearing seals whereby they may not only be economically manufactured, but will be more efficient in use, automatic in operation, uniform in action, and unlikely to get out of repair.

A further object of the invention is to provide a bearing seal which will be sensitive and responsive to variations of the engaged surface over a relatively wide range thereby making the seal especially applicable to shaft bearings which are out of true.

A further object of the invention is to provide a unitary seal assembly the parts of which may be permanently combined at the time of manufacture and subsequently installed and removed readily and easily by unskilled workmen without disturbing the tension or adjustment of the seal parts, and whereby they will be protected against damage.

A further object of the invention is to provide means preventing the passage of lubricant about the outside of the sealing unit.

A further object of the invention is to provide an improved manner of interconnecting the flexible diaphragm with the seal ring and with the mount.

A further object of the invention is to provide an improved manner of interconnecting the parts into a unitary assembly.

A further object of the invention is to provide a bearing seal having the structural features of advantage and meritorious characteristics herein mentioned.

With the above primary and other incidental objects in view, as will more fully appear in the specification, the invention consists of the features of construction, the parts and combinations thereof, and the mode of operation, or their equivalents, as hereinafter described and set forth in the claims.

In the accompanying drawing wherein is shown the preferred, but obviously not necessarily the only form of embodiment of the invention, Fig. 1 is a perspective view of the assembled unit forming the subject matter hereof.

Fig. 2 is a detail sectional view of a shaft bearing and the seal unit associated therewith.

Fig. 3 is an enlarged detail sectional view.

Fig. 4 is a front elevation of the mounting collar.

Like parts are indicated by similar characters of reference throughout the several views.

In the drawing, 1 indicates a hub or bearing portion of a machine enclosing a conventional ball bearing unit 2 in which is mounted a rotary shaft 3. Seated within the hub or mounting concentrically with the shaft and in abutting relation with the bearing unit 2 is the sealing unit embodying the present invention. This unit comprises a recessed mounting collar 4 having at its periphery an internal rabbet formed by a peripheral flange 5 and a contiguous abutment face 6. Adjacent the inner circumference of the mounting collar and in a plane axially offset from that of the abutment face 6 are a plurality of spaced spring seats or sockets 7 projecting from the face of the mounting collar adjacent to the bearing 2. Located within the flanged periphery of the mounting collar 4 is a clamp ring 8 complementary to the abutment face 6. Interposed between the abutment face 6 and the clamp ring 8 is the peripheral portion of an annular thin flexible diaphragm 9 of bronze, copper or any other suitable material.

Gaskets 10 of composition, paper, rubber or the like are disposed on opposite sides of the diaphragm 9 between the clamp ring and the abutment face 6 and the ring 8 is pressed tightly against the gaskets and interposed periphery of the diaphragm to securely clamp them in position. The clamp ring has a close press fit within the peripheral flange 5 and is chamfered to receive the margin of the mounting collar flange 5 which is clenched over the ring by a spinning or coining operation by which the parts are securely and permanently united.

The inner margin of the flexible diaphragm is securely attached to a contact ring 11 which bears upon a rotating part, which in the present instance is shown to be the inner race of the ball bearing 2. This contact ring may be of any suitable material of which steel, bronze, and bronze graphite compound material have been used successfully. However at the present time sealing contact rings of cast iron having a high free carbon content are considered most desirable. The invention however is not limited to the specific material or composition of the bearing ring.

The bearing ring 11 is formed with an internal rounded bead 12 with which cooperates a clamp ring 13 of relatively stiff sheet metal. The inner margin of the annular diaphragm is interposed between the bead 12 of the bearing ring and the ring 13 and the latter together with the contiguous margin of the diaphragm are pressed or spun into conformity with the bead 12 and clenched thereabout to securely clamp the flexible diaphragm 9 to the bearing ring.

The diaphragm 9 is flexible but not necessarily resilient. No reliance is placed upon the reaction of the diaphragm to maintain a tight contact of the sealing ring upon the rotating part. To the contrary the lack of tension in the diaphragm permits a more responsive action thereof under influence of a series of short helical springs 14 seated in the spaced sockets or seats 7. These springs 14 bear against the ring 13 thereby tending to force the bearing ring 11 axially against the rotating part, which movement is permitted by the flexing action of the diaphragm. While the ring 11 in the present instance is shown as engaging the inner race of the ball bearing it may in like manner engage a shoulder on the shaft or any ring or collar secured thereto.

The mounting collar 4 is formed with an external rabbet 15 in which is seated a thrust ring or spacer 16. The thrust ring 16 is peripherally recessed or rabbeted for reception of a sealing gasket 17 of rubber or other packing material which may be compressed within the annular chamber formed intermediate the interior face of the mounting hub 1, the peripheral recess of the thrust ring and face of the mounting ring. The compression of the packing ring 17 in such chamber prevents the seepage of lubricant about the outside of the sealing unit.

Pressure is afforded to compress such packing 17 and hold the sealing unit tightly against the outer face of the ball bearing by a clamp collar 18 adjustably secured to the hub or machine by bolts or screws 19.

The unitary seal unit comprises the mounting ring 4, the clamp ring 8, the diaphragm 9, and bearing collar 11, the tension springs and pressure ring 13 all of which are permanently maintained in assembled relation by the spinning or coining of the margin of the marginal flange 5 over the outside of the clamp ring 8 and the like spinning or coining of the pressure ring 13 about the rounded bead 12 of the bearing collar 11. This unit which is assembled at the time of manufacture can be installed and removed without disturbance of the relation of parts or change of tension by merely releasing the screws or bolts 19. This enables repairs and replacements to be quickly made by unskilled persons and insures uniform functioning of the seal at all times.

In the drawing the ball bearing unit 2 has been shown as abutting a spacer collar 2a intermediate the bearing and a shoulder on the shaft 3. It is to be understood that in some instances the bearing unit may directly engage the shaft shoulder.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

Having thus described my invention, I claim:

1. A unitary bearing seal including a mounting ring having a laterally extending peripheral flange, a clamp ring over which the peripheral flange is extended in clenched relation, an annular flexible diaphragm, the outer margin of which is permanently clamped between the mounting ring and clamp ring, a bearing ring engageable with a rotating part, an internal bead formed in said bearing ring, a second clamp ring conforming substantially to the internal bead of the bearing ring and permanently clamping the inner margin of the diaphragm therebetween, a series of spaced sockets on the mounting ring contiguous to the inner margin thereof, a plurality of helical springs seated in the sockets, a thrust ring associated with said unit and a ring of packing material exteriorly of the unit and subjected to compression by the thrust ring for exteriorly sealing the unit against the seepage of lubricant thereabout.

2. In a bearing seal, a mounting ring comprising an annular recessed member, a laterally extending marginal flange projecting therefrom, a seat for a diaphragm contiguous to the marginal flange, an annular series of spring receiving sockets contiguous to the inner circumference of the annular mounting ring, a diaphragm marginally seated upon the mounting ring seat contiguous to said flange, and fixedly secured thereto by contraction of the flange, a contact ring carried by the diaphragm and a series of springs interposed between the contact ring and mounting ring and seated in said sockets.

3. In a bearing seal, a mounting ring, an annular flexible diaphragm marginally secured to the mounting ring, a contact ring including an internal bead about which the opposite margin of the annular flexible diaphragm conforms, a ring conforming to the internal bead of the contact ring and clamping the margin of the diaphragm therebetween, and spring means interposed between the mounting and contact ring.

4. In a bearing seal, a contact ring, a rounded bead formed upon the inner circumference of the ring, a flexible diaphragm the margin of which overlaps the ring and conforms to the rounded bead thereof and a clamp ring between which and the bead of the contact ring the margin of the diaphragm is clamped, said clamp ring and interposed portion of the diaphragm being spun into close conformity with the rounded bead upon the interior surface of the contact ring.

5. In a bearing seal a unit including an annular mount, a flexible diaphragm carried thereby and a contact ring carried by the diaphragm, an annular body of packing material peripherally surrounding the unit and abutting axially thereon, and means for compressing the packing material against the unit in an axial direction to seal the unit against seepage of lubricant thereabout.

6. In a bearing seal, a mounting ring, a flexible diaphragm and a bearing ring carried thereby, said mounting ring having therein a peripheral rabbet, a thrust ring seated in the peripheral rabbet of the mounting ring, a ring of packing material interposed between the mounting ring and thrust ring and abutting on both and means for applying pressure to the thrust ring for compressing the packing ring in an axial direction.

7. A bearing seal including a flexible diaphragm, a ring associated therewith about intersecting faces of which a marginal portion of the diaphragm is extended in conformity therewith, and a second ring overlying the portion of the diaphragm conforming to said intersecting faces of the ring and shaped to conform thereto in clamping relation to fixedly secure the diaphragm to the ring.

8. A sealing unit including an annular flexible diaphragm, a pair of concentric rings coincident with the inner and outer margins of the diaphragm, at least one of the rings having a projecting portion and the marginal portion of the diaphragm being secured to that ring by being spun into conformity with the projection on the ring a part of which is circular, and a strip of sheet material overlying the ring engaging portion of the diaphragm and also spun into conformity with the said projection on the ring and clamping the interposed marginal portion of the diaphragm thereto.

9. A bearing seal unit, including a mount free for axial sliding motion toward and from a bearing unit to be sealed, a flexible diaphragm carried thereby, a contact ring carried by the diaphragm and yieldingly engaging one of the bearing elements, a body of packing material by the resistance of which the seal unit is held in operative relation with the bearing unit member and means for compressing the packing material in an axial direction against the mount, whereby leakage of lubricant thereabout is prevented.

ARTHUR F. BERGER.